(12) United States Patent
Sheng et al.

(10) Patent No.: US 11,289,919 B2
(45) Date of Patent: Mar. 29, 2022

(54) CHARGING CONTROL SYSTEM

(71) Applicant: Huizhou TCL Mobile Communication Co., Ltd, Guangdong (CN)

(72) Inventors: Chulong Sheng, Guangdong (CN); Wentao Huang, Guangdong (CN)

(73) Assignee: Huizhou TCL Mobile Communication Co., Ltd, Huizhou (CN)

( * ) Notice: Subject to any disclaimer, the term of this patent is extended or adjusted under 35 U.S.C. 154(b) by 475 days.

(21) Appl. No.: 16/312,764

(22) PCT Filed: Dec. 8, 2017

(86) PCT No.: PCT/CN2017/115146
§ 371 (c)(1),
(2) Date: Dec. 21, 2018

(87) PCT Pub. No.: WO2018/113531
PCT Pub. Date: Jun. 28, 2018

(65) Prior Publication Data
US 2019/0326760 A1    Oct. 24, 2019

(30) Foreign Application Priority Data
Dec. 23, 2016  (CN) .......................... 201611201927.7

(51) Int. Cl.
*H02J 7/00*   (2006.01)
*G06F 1/26*   (2006.01)
*H01M 10/44*  (2006.01)

(52) U.S. Cl.
CPC .............. *H02J 7/0018* (2013.01); *G06F 1/26* (2013.01); *H01M 10/441* (2013.01); *H02J 7/007* (2013.01); *H02J 7/00* (2013.01)

(58) Field of Classification Search
CPC ........ G06F 1/26; G06F 1/266; H01M 10/441; H02J 7/00; H02J 7/0018; H02J 7/007;
(Continued)

(56) References Cited

U.S. PATENT DOCUMENTS

2003/0030412 A1*  2/2003  Matsuda ............... G06F 1/3237
                                                         320/127
2006/0076977 A1*  4/2006  Zhu ..................... G06F 13/4081
                                                         326/86
(Continued)

FOREIGN PATENT DOCUMENTS

CN        102857719 A       1/2013
CN        104638732 A       5/2015
(Continued)

OTHER PUBLICATIONS

Search Report of counterpart European Patent Application No. 17883731.6 dated Dec. 2, 2019.

*Primary Examiner* — Jack Chiang
*Assistant Examiner* — Aric Lin

(57) ABSTRACT

The present disclosure discloses a charging control system, which includes: a master device, including a first USB interface and a first charging management circuit; at least one slave device, including a second USB interface and a second charging management circuit; a gating control circuit, which is arranged in the master device or the slave device, wherein an input terminal of the gating control circuit is coupled to the first USB interface and the second USB interface, and an output terminal of the gating control circuit is coupled to the first charging management circuit and the second charging management circuit to select and control a charging USB interface of the first charging management circuit and a charging USB interface of the second charging management circuit. Through the above mentioned way, multiple charging modes of the master device and the slave device may be implemented without software support.

19 Claims, 5 Drawing Sheets

(58) Field of Classification Search
CPC ...... H02J 7/00712; H02J 2207/40; H02J 1/10; Y02E 60/10
See application file for complete search history.

(56) References Cited

U.S. PATENT DOCUMENTS

| | | |
|---|---|---|
| 2006/0145666 A1 | 7/2006 | Liu |
| 2008/0265838 A1* | 10/2008 | Garg ........................ H02J 7/00 320/115 |
| 2010/0100200 A1* | 4/2010 | Kim .................... G06F 13/4081 700/12 |
| 2010/0125686 A1 | 5/2010 | Perng et al. |
| 2011/0076530 A1 | 3/2011 | Miyamoto et al. |
| 2011/0101913 A1* | 5/2011 | Matsumoto ......... H01M 10/441 320/107 |
| 2013/0154550 A1 | 6/2013 | Balmefrezol et al. |
| 2014/0009120 A1 | 1/2014 | Kim |
| 2015/0180254 A1 | 6/2015 | Zhao |

FOREIGN PATENT DOCUMENTS

| | | |
|---|---|---|
| GN | 103701156 A | 4/2014 |
| GN | 104467055 A | 3/2015 |

\* cited by examiner

CHARGING CONTROL SYSTEM

CROSS-REFERENCE TO RELATED APPLICATIONS

The present application is a 35 U.S.C. § 371 National Phase conversion of International (PCT) Patent Application No. PCT/CN2017/115146 filed Dec. 8, 2017, which claims foreign priority of Chinese Patent Application No. 201611201927.7, filed on Dec. 23, 2016 in the State Intellectual Property Office of China, the contents of all of which are hereby incorporated by reference.

TECHNICAL FIELD

The present disclosure relates to the field of communications technologies, and more particularly, to a charging control system.

BACKGROUND

At present, a lot of terminal devices are provide with ancillary terminal devices, which need to be power-supplied to implement their functions. In the prior art, the terminal devices generally need additional software support to supply power for their ancillary terminal devices. However, after the terminal devices are powered off, in charging modes required for additional software support, it is impossible to charge these ancillary terminal devices by the terminal devices.

SUMMARY

The present disclosure provides a charging control system to solve the problem that after the terminal devices are powered off, in charging modes required for additional software support, it is impossible to charge these ancillary terminal devices.

To solve the above problem, the present disclosure provides a charging control system, which includes: a master device, including a first USB interface and a first charging management circuit, the first USB interface includes a D+ terminal, a D− terminal, a VBUS terminal and a ID terminal; at least one slave device, including a second USB interface and a second charging management circuit, the second USB interface includes a D+ terminal, a D− terminal and a VBUS terminal; and a gating control circuit including an input terminal and an output terminal, arranged in the master device or the slave device. The input terminal of the gating control circuit is coupled to the first USB interface and the second USB interface, and the output terminal of the gating control circuit is coupled to the first charging management circuit and the second charging management circuit to select and control a charging USB interface of the first charging management circuit and a charging USB interface of the second charging management circuit.

The gating control circuit includes a switch control circuit, and the switch control circuit further includes a first switch control unit, a second switch control unit, a third switch control circuit, and a fourth switch control circuit. The first switch control unit includes an input terminal and an output terminal. The input terminal of the first switch control unit connects the VBUS terminal of the first USB interface, and the output terminal of the first switch control unit connects the first charging management circuit to control the VBUS terminal of the first USB interface to supply power for the first charging management circuit. The second switch control unit includes an input terminal and an output terminal. The input terminal of the second switch control unit connects the VBUS terminal of the second USB interface, and the output terminal of the second switch control unit connects the first charging management circuit to control the VBUS terminal of the second USB interface to supply power for the first charging management circuit. The third switch control unit includes an input terminal and an output terminal. The input terminal of the third switch control unit connects the VBUS terminal of the first USB interface, and the output terminal of the third switch control unit connects the second charging management circuit to control the VBUS terminal of the first USB interface to supply power for the second charging management circuit. The fourth switch control unit includes an input terminal and an output terminal. The input terminal of the fourth switch control unit connects the VBUS terminal of the second USB interface, and an output terminal of the fourth switch control unit connects the second charging management circuit to control the VBUS terminal of the second USB interface to supply power for the second charging management circuit.

The gating control circuit further includes a first determination control circuit, a second determination control circuit, a first logic control circuit, and a second logic control circuit. The first determination control circuit includes an input terminal and an output terminal. The input terminal of the first determination control circuit connects the D+ terminal and the D− terminal of the first USB interface to control an output state of the first determination control circuit based on a connection state between the D+ terminal and the D− terminal of the first USB interface. The second determination control circuit includes an input terminal and an output terminal. The input terminal of the second determination control circuit connects the D+ terminal and the D− terminal of the second USB interface to control an output state of the second determination control circuit based on a connection state between the D+ terminal and the D− terminal of the second USB interface. The first logic control circuit includes an input terminal and an output terminal. The input terminal of the first logic control circuit connects the ID terminal of the first USB interface and the output terminal of the second determination control circuit, and the output terminal of the first logic control circuit connects the first switch control unit to control on or off of the first switch control unit based on a level state of the ID terminal of the first USB interface and the output state of the second determination control circuit. The output terminal of the second determination control circuit further connects the input terminal of the second switch control unit to control on or off of the second switch control unit based on output of the second determination control circuit. The input terminal of the second logic control circuit connects the output terminal of the first determination control circuit, and the output terminal of the second logic control circuit connects the input terminal of the fourth switch control unit to control on or off of the fourth switch control unit based on the output state of the second determination control circuit. The output terminal of the first determination control circuit further connects the input terminal of the third switch control unit to control on or off of the third switch control unit based on the output state of the first determination control circuit.

The first determination control circuit further includes a first determination unit and a first control switch. The first determination unit includes an input terminal and an output terminal, and the first control switch includes an input terminal and an output terminal. The input terminal of the first determination unit connects the D+ terminal and the D− terminal of the first USB interface to determine whether the D+ terminal of the first USB interface is short-circuited with the D− terminal of the first USB interface. The input terminal of the first control switch connects the output terminal of the first determination unit to control on or off of the first control switch based on the connection state between the D+ terminal and the D− terminal of the first USB interface. The second determination control circuit further includes a second determination unit and a second control switch. The second determination unit includes an input terminal and an output terminal, and the second control switch includes an input terminal and an output terminal. The input terminal of the second determination unit connects the D+ terminal and the D− terminal of the second USB interface to determine whether the D+ terminal of the second USB interface is short-circuited with the D− terminal of the second USB interface. The input terminal of the second control switch connects the output terminal of the second determination unit to control on or off of the second control switch based on the connection state between the D+ terminal and the D− terminal of the second USB interface.

When the first determination unit determines that the D+ terminal of the first USB interface is short-circuited with the D− terminal of the first USB interface, the first determination unit controls the first control switch to be on. When the first determination unit determines that the D+ terminal of the first USB interface is not short-circuited with the D− terminal of the first USB interface, the first determination unit controls the first control switch to be off. When the second determination unit determines that the D+ terminal of the second USB interface is short-circuited with the D− terminal of the second USB interface, the second determination unit controls the second control switch to be on. When the second determination unit determines that the D+ terminal of the second USB interface is not short-circuited with the D− terminal of the second USB interface, the second determination unit controls the second control switch to be off.

The first logic control circuit further includes a first reverser and a multiplier. The first reverser includes an input terminal and an output terminal, and the multiplier includes an input terminal and an output terminal. The input terminal of the first reverser connects the output terminal of the second determination control circuit, the input terminal of the multiplier connects the ID terminal of the first USB interface and an output terminal of the first reverser, and the output terminal of the multiplier connects the first switch control unit to control on or off of the first switch control unit based on an output state of the multiplier. The second logic control circuit further includes a second reverser, the second reverser includes an input terminal and an output terminal. The input terminal of the second reverser connects the first determination control circuit, and the output terminal of the second reverser connects the fourth switch control unit to control on or off of the fourth switch control unit based on an output state of the second reverser.

The gating control module further includes a first current control circuit and a second current control circuit. The first current control circuit includes an input terminal and an output terminal. The input terminal of the first current control circuit connects the output terminal of the first determination control circuit and the output terminal of the second determination control circuit, and the output terminal of the first current control circuit connects the first charging management circuit to control charging current transmitted from the first charging management circuit to a first battery based on the output state of the first determination control circuit and the output state of the second determination control circuit. The second current control circuit includes an input terminal and an output terminal. The input terminal of the second current control circuit connects the output terminal of the first determination control circuit and the output terminal of the second determination control circuit, and the output terminal of the second current control circuit connects the second charging management circuit to control charging current transmitted from the second charging management circuit to a second battery based on the output state of the first determination control circuit and the output state of the second determination control circuit.

When the first determination control circuit is on and the second determination control circuit is off, or when the first determination control circuit is off and the second determination control circuit is on, the first current control circuit controls the first charging management circuit to transmit the charging current to the first battery of the master device based on a charging type, and the second current control circuit controls the second charging management circuit to transmit the charging current to the second battery of the salve device based on a charging type. When the first determination control circuit and the second determination control circuit are simultaneously off, or when the first determination control circuit and the second determination control circuit are simultaneously on, the first current control circuit controls the first charging management circuit to charge the first battery of the master device at a fixed charging current, and the second current control circuit controls the second charging management circuit to charge the second battery of the salve device at a fixed charging current.

The master device supports an On-The-Go (OTG) function, whereas the slave device does not support the OTG function.

When the master device enables the OTG function, the ID terminal of the first USB interface is a low level, and the VBUS terminal of the first USB interface is turned off.

In the charging control system of the present disclosure, the master device and the slave device are provided with a plurality of charging input circuit. The input terminal of the gating control circuit is coupled to the first USB interface of the master device and the second USB interface of the slave device, and the output terminal of the gating control circuit is coupled to the first charging management circuit of the master device and the second charging management circuit of the slave device. The gating control circuit selects and controls charging USB interfaces of the charging management circuits of the master device and the slave device by means of switch regulating and logical circuits to implement charging control in different modes without additional software support.

DETAILED DESCRIPTION

Technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
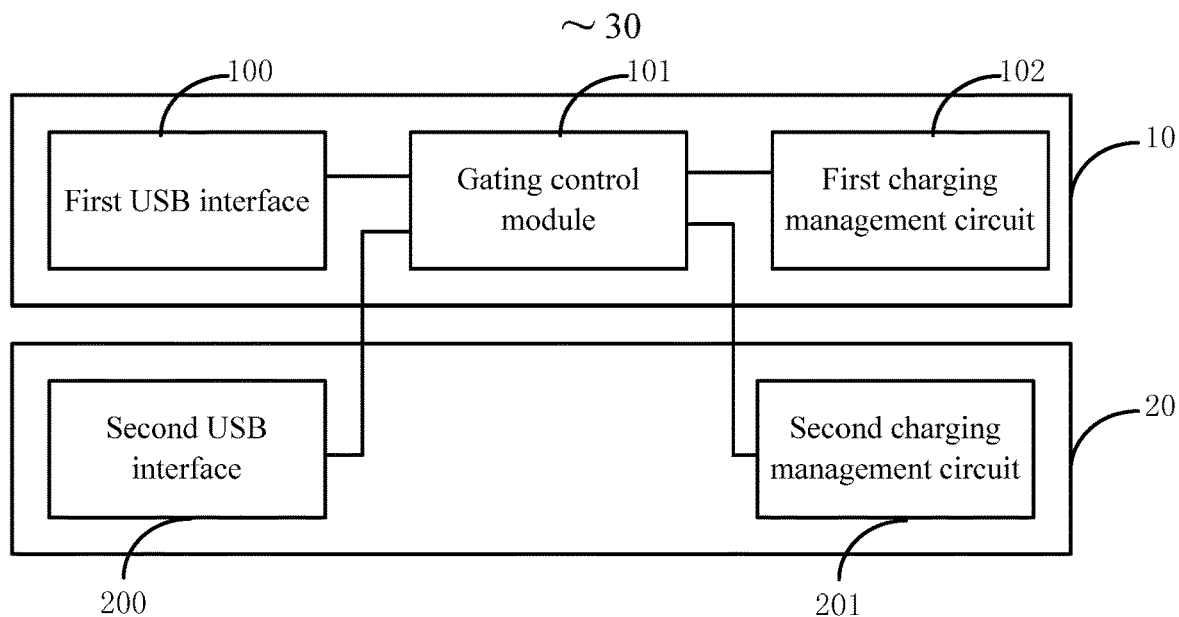
FIG. 1 is a schematic structural diagram of a charging control system according to a first embodiment of the present disclosure.

Referring to FIG. 1, FIG. 1 is a schematic structural diagram of a charging control system according to a first embodiment of the present disclosure. For ease of description, the charging control system 30 of this embodiment may be described by taking a master device 10 and one slave device 20 as an example. However, the present disclosure does not limit the number of the slave devices 20.

The master device 10 may support an On-The-Go (OTG) function, and the master device 10 may be a tablet computer or may be a smart television, but is not limited thereto. The slave device 20 may not support the OTG function, and the slave device 20 may be a keyboard or may be a mouse, but is not limited thereto. When the master device enables the OTG function, that is, when a first USB interface 100 of the master device 10 is connected to other terminal devices only for data interaction, the ID terminal of the first USB interface 100 is a low level, an output state thereof is "0", and the VBUS terminal of the first USB interface 100 is off.

Further, in this embodiment, the charging control system 30 may include a gating control circuit 101, arranged in the master device 10. In other embodiments, the gating control circuit 101 also may be arranged in the slave device 20. the gating control circuit 101 may include an input terminal and an output terminal.

Specifically, the input terminal of the gating control circuit 101 may be coupled to the first USB interface 100 of the master device 10 and the second USB interface 200 of the slave device 20, and the output terminal of the gating control circuit 101 may be coupled to the first charging management circuit 102 of the master device 10 and the second charging management circuit 201 of the slave device 20 to select and control the first USB interface 100 or the second USB interface 200 to supply power for the first charging management circuit 102 or the second charging management circuit 201.

By way of the above connection mode, the gating control circuit 101 can select and control charging USB interfaces of the charging management circuits of the master device 10 and the slave device 20 to implement multiple charging modes of the master device and the slave device.

Figure 2:
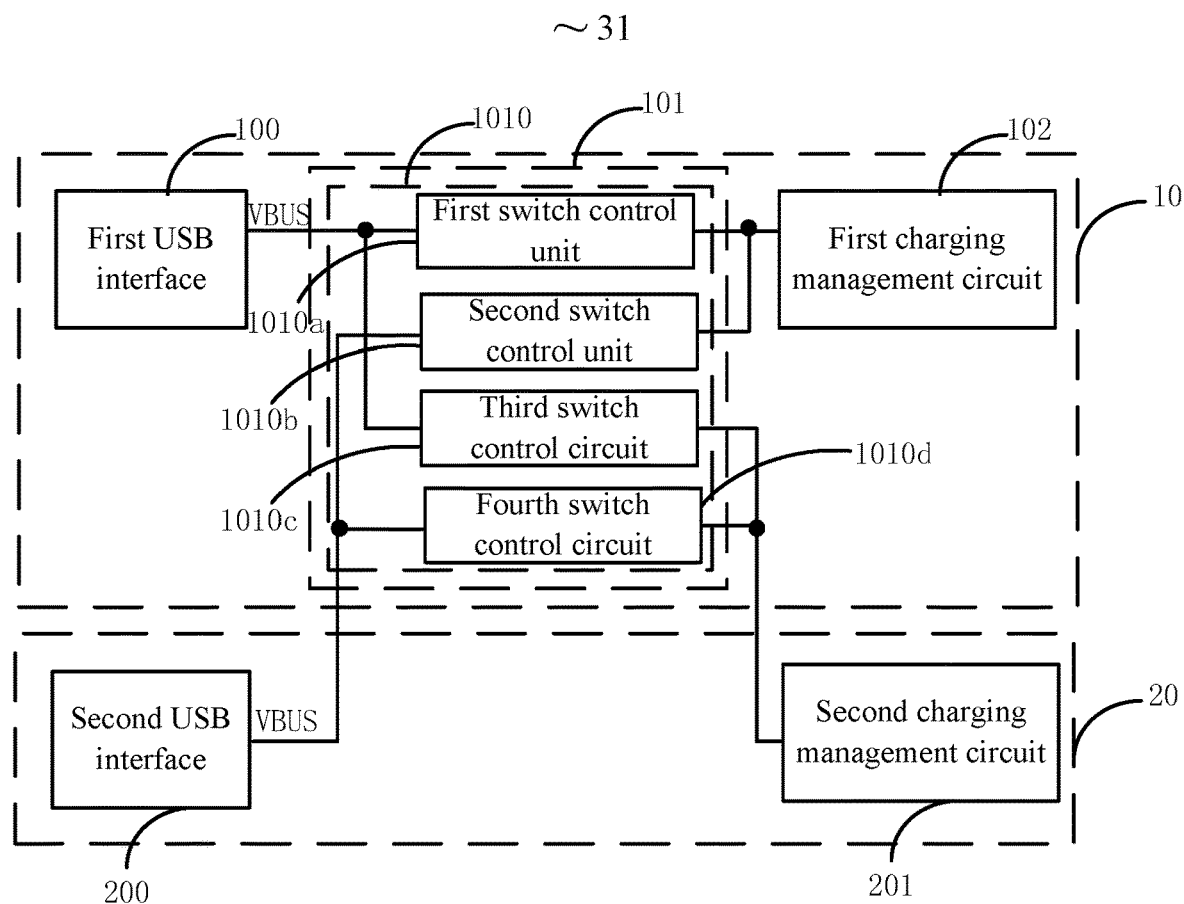
FIG. 2 is a schematic structural diagram of a charging control system according to a second embodiment of the present disclosure.

Referring to FIG. 2, FIG. 2 is a schematic structural diagram of a charging control system according to a second embodiment of the present disclosure. Different from the charging control system 30 of the first embodiment, in the charging control system 31 of this embodiment on the basis of the charging control system 30 of the first embodiment, the gating control circuit 101 may include a switch control circuit 1010.

Further, the switch control circuit 1010 may include a first switch control unit 1010a, a second switch control unit 1010b, a third switch control circuit 1010c, and a fourth switch control circuit 1010d. Specifically, the first switch control unit 1010a, the second switch control unit 1010b, the third switch control circuit 1010c and the fourth switch control circuit 1010d are configured to control on or off of charging circuits in different charging modes, which may be single-pole single-throw (SPST) switches or may be switch transistors, but are not limited thereto.

Specifically, the first switch control unit 1010a may include an input terminal and an output terminal. The an input terminal of the first switch control unit 1010a may connect the VBUS terminal of the first USB interface 100, and the output terminal of the first switch control unit 1010a may connect the first charging management circuit 102 to control the VBUS terminal of the first USB interface 100 to supply power for the first charging management circuit 102.

The second switch control unit 1010b may include an input terminal and an output terminal. The input terminal of the second switch control unit 1010b may connect the VBUS terminal of the second USB interface 200, and the output terminal of the second switch control unit 1010b may connect the first charging management circuit 102 to control the VBUS terminal of the second USB interface 200 to supply power for the first charging management circuit 102.

The third switch control unit 1010c may include an input terminal and an output terminal. The input terminal of the third switch control unit 1010c may connect the VBUS terminal of the first USB interface 100, and the output terminal of the third switch control unit 1010c may connect the second charging management circuit 201 to control the VBUS terminal of the first USB interface 100 to supply power for the second charging management circuit 201.

The fourth switch control unit 1010d may include an input terminal and an output terminal. The input terminal of the fourth switch control unit 1010d may connect the VBUS terminal of the second USB interface 200, and the output terminal of the fourth switch control unit 1010d may connect the second charging management circuit 201 to control the VBUS terminal of the second USB interface 200 to supply power for the second charging management circuit 201.

Figure 3:
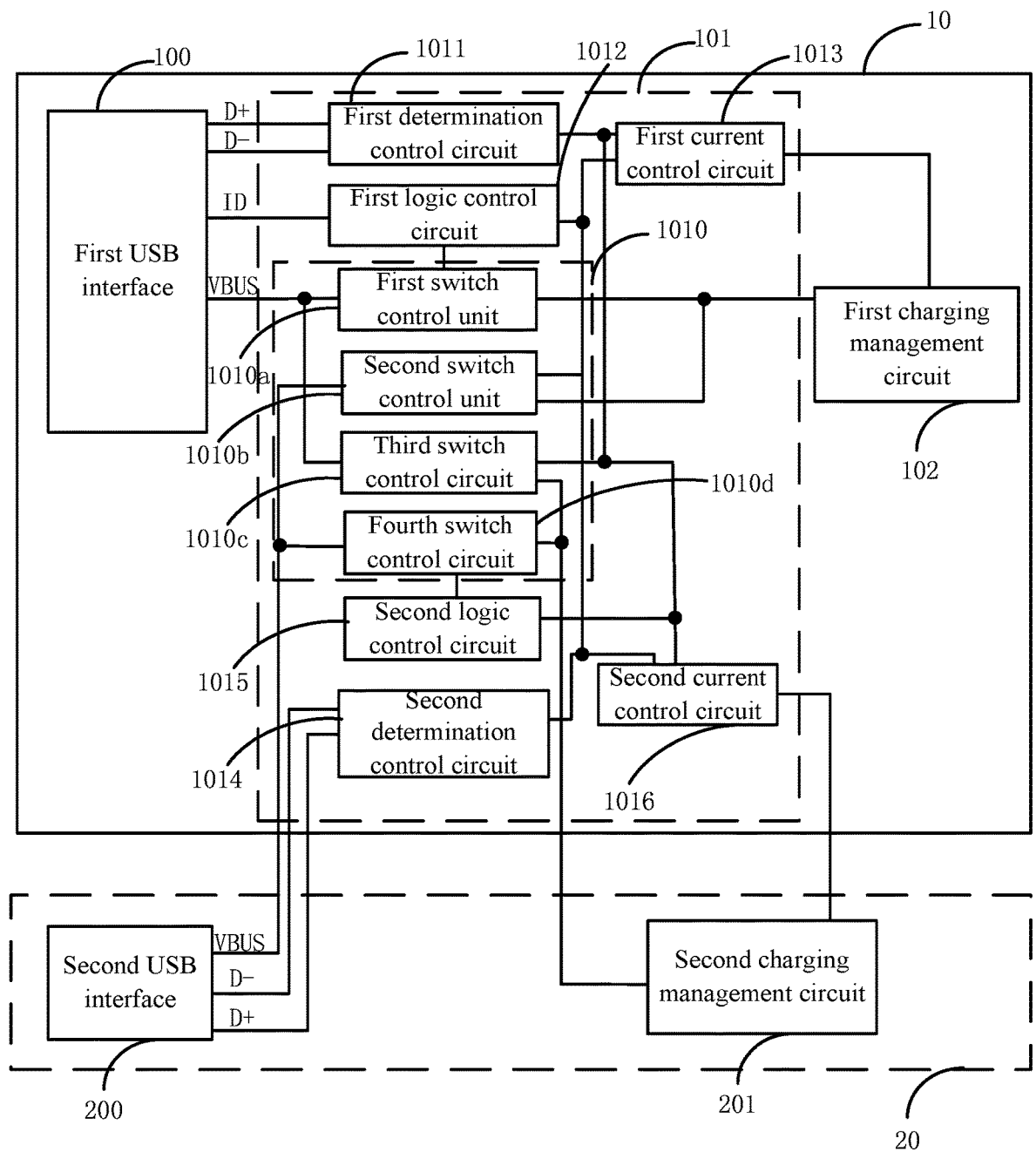
FIG. 3 is a schematic structural diagram of a charging control system according to a third embodiment of the present disclosure.
Figure 4:
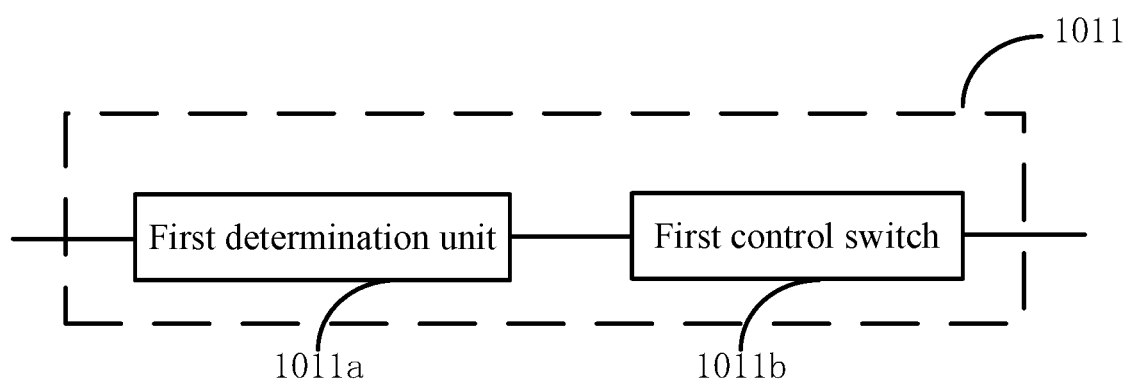
FIG. 4 is a schematic structural diagram of a first determination control circuit in FIG. 3 according to an embodiment.

Further referring to FIG. 3, FIG. 3 is a schematic structural diagram of a charging control system according to a third embodiment of the present disclosure. Different from the charging control system 31 of the second embodiment, in the charging control system 32 of this embodiment on the basis of the charging control system 31, the gating control circuit 101 further includes a first determination control circuit 1011, a second determination control circuit 1014, a first logic control circuit 1012, and a second logic control circuit 1015.

Figure 5:
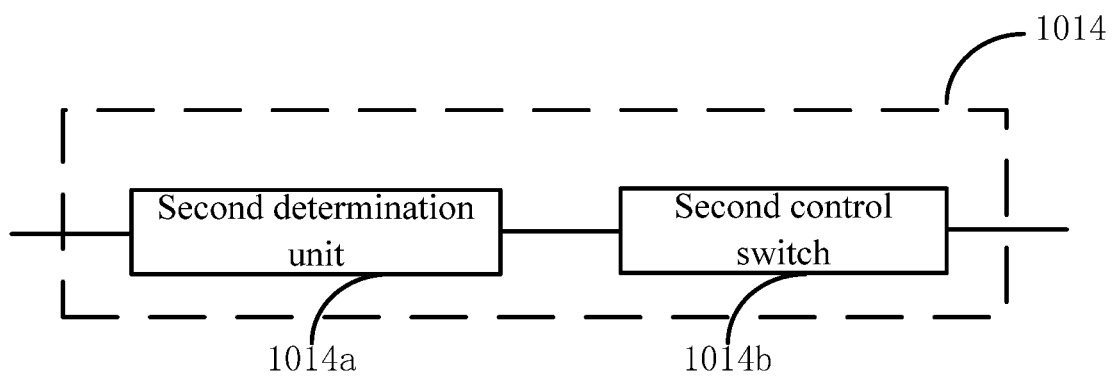
FIG. 5 is a schematic structural diagram of a second determination control circuit in FIG. 3 according to an embodiment.
Figure 6:
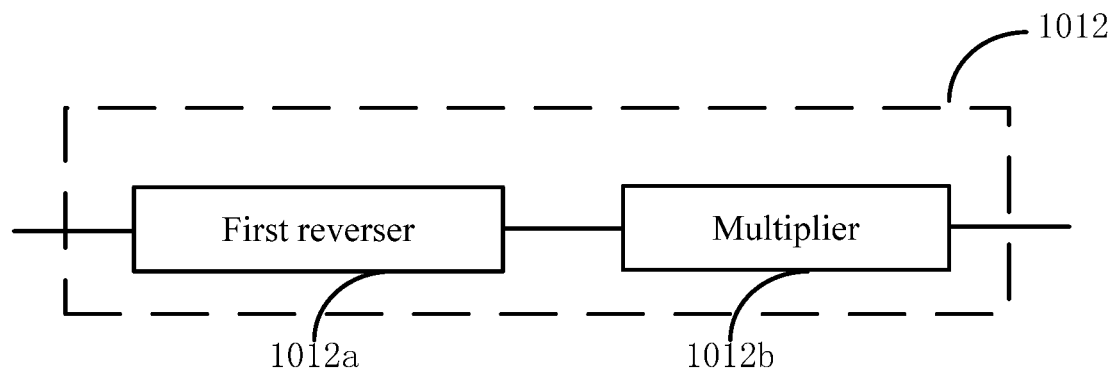
FIG. 6 is a schematic structural diagram of a first logic control circuit in FIG. 3 according to an embodiment.
Figure 7:
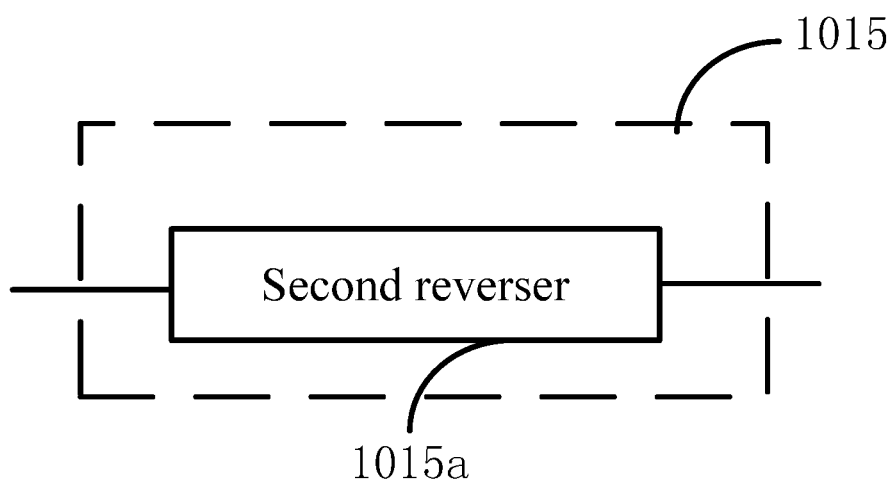
FIG. 7 is a schematic structural diagram of a second logic control circuit in FIG. 3 according to an embodiment.

Jointly referring to FIG. 4-FIG. 7, FIG. 4 is a schematic structural diagram of the first determination control circuit 1011 in FIG. 3 according to an embodiment; FIG. 5 is a schematic structural diagram of the second determination control circuit 1014 in FIG. 3 according to an embodiment; FIG. 6 is a schematic structural diagram of the first logic control circuit 1012 in FIG. 3 according to an embodiment; and FIG. 7 is a schematic structural diagram of the second logic control circuit 1015 in FIG. 3 according to an embodiment.

Further, the first determination control circuit 1011 may include a first determination unit 1011a and a first control switch 1011b. The second determination control circuit 1014 may include a second determination unit 1014a and a second control switch 1014b. Specifically, the first control switch 1011*b* and the second control switch 1014*b* may be configured to control on or off of the first switch control unit 1010*a*, the second switch control unit 1010*b*, the third switch control circuit 1010*c* and the fourth switch control circuit 1010*d*. The first control switch 1011*b* and the second control switch 1014*b* may be single-pole single-throw (SPST) switches or may be switch transistors, but are not limited thereto.

Specifically, the first determination circuit 1011*a* may include an input terminal and an output terminal, and the first control switch 1010*b* may include an input terminal and an output terminal The input terminal of the first determination unit 1011*a* may connect the D+ terminal and the D− terminal of the first USB interface 100 to determine whether the D+ terminal of the first USB interface 100 is short-circuited with the D− terminal of the first USB interface 100. The input terminal of the first control switch 1011*b* may connect an output terminal of the first determination unit 1011*a* to control on or off of the first control switch 1011*b* based on the connection state between the D+ terminal and the D− terminal of the first USB interface 100. Specifically, when the first USB interface 100 is connected to a terminal device via a USB data line to supply power, the first determination unit 1011*a* determines that the D+ terminal of the first USB interface 100 is short-circuited with the D− terminal of the first USB interface 100, and the first determination unit 1011*a* controls the first control switch 1011*b* to be on. At this moment, the output state of the first control switch 1011*b* may be "1". When the first USB interface 100 is connected to a charging head via a USB data line to supply power, the first determination unit 1011*a* determines that the D+ terminal of the first USB interface 100 is not short-circuited with the D− terminal of the first USB interface 100, and the first determination unit 1011*a* controls the first control switch 1011*b* to be off. At this moment, the output state of the first control switch 1011*b* may be "0".

The second determination unit 1014*a* may include an input terminal and an output terminal, and the second control switch 1014*b* may include an input terminal and an output terminal. The input terminal of the second determination unit 1014*a* may connect the D+ terminal of the second USB interface 200 and the D− terminal of the second USB interface 200 to determine whether the D+ terminal of the second USB interface 200 is short-circuited with the D− terminal of the second USB interface 200. The input terminal of the second control switch 1014*b* may connect the output terminal of the second determination unit 1014*a* to control on or off of the second control switch 1014*b* based on the connection state between the D+ terminal of the second USB interface 200 and the D− terminal of the second USB interface 200. Specifically, when the second USB interface 200 is connected to a terminal device via a USB data line to supply power, the second determination unit 1014*a* determines that the D+ terminal of the second USB interface 200 is short-circuited with the D− terminal of the second USB interface 200, and the second determination unit 1014*a* controls the second control switch 1014*b* to be on. At this moment, the output state of the second control switch 1014*b* may be "1". When the second USB interface 200 is connected to a charging head via a USB data line to supply power, the second determination unit 1014*a* determines that the D+ terminal of the second USB interface 200 is not short-circuited with the D− terminal of the second USB interface 200, and the second determination unit 1014*a* controls the second control switch 1014*b* to be off. At this moment, the output state of the second control switch 1014*b* may be "0".

Through the above mentioned way, the master device 10 may determine that the first USB interface 100 is connected to a terminal device or a charging head via a USB data line to supply power based on the output state (on or off) of the first control switch 1011*b*, and the slave device 20 may determine that the second USB interface 200 is connected to a terminal device or a charging head via a USB data line to supply power based on the output state (on or off) of the second control switch 1014*b*.

Further, the first logic control circuit 1012 may include a first reverser 1012*a* and a multiplier 1012*b*. The first reverser 1012*a* may include an input terminal and an output terminal, and the multiplier 1012*b* may include an input terminal and an output terminal. The input terminal of the first reverser 1012*a* may connect the output terminal of the second control switch 1014*b* of the second determination control circuit 1014, the input terminal of the multiplier 1012*b* may connect the ID terminal of the first USB interface 100 and the output terminal of the first reverser 1012*a*, and the output terminal of the multiplier 1012*b* may connect the first switch control unit 1010*a* to control on or off of the first switch control unit 1010*a* based on an output state of the multiplier 1012*b*. Specifically, when the output state of the multiplier 1012*b* is "1", the first switch control unit 1010*a* is controlled to be on. At this moment, the first charging management circuit 102 may be power-supplied by the VBUS terminal of the first USB interface 100. When the output state of the multiplier 1012*b* is "0", the first switch control unit 1010*a* is controlled to be off.

The output terminal of the second control switch 1014*b* of the second determination control circuit 1014 further connects the input terminal of the second switch control unit 1010*b* to control on or off of the second switch control unit 1010*b* based on the output state of the second control switch 1014*b* of the second determination control circuit 1014. Specifically, when the second control switch 1014*b* is on, namely when the output state of the second control switch 1014*b* is "1", the second switch control unit 1010*b* is controlled to be on. At this moment, the first charging management circuit 102 may be power-supplied by the VBUS terminal of the second USB interface 200. When the second control switch 1014*b* is off, namely when the output state of the second control switch 1014*b* is "0", the second switch control unit 1010*b* is controlled to be off.

The second logic control circuit 1015 further includes a second reverser 1015*a*. The second reverser 1015*a* may include an input terminal and an output terminal. The input terminal of the second reverser 1015*a* may connect the output terminal of the first control switch 1011*b* of the first determination control circuit 1011, and the output terminal of the second reverser 1015*a* may connect the fourth switch control unit 1010*d* to control on or off of the fourth switch control unit 1010*d* based on an output state of the second reverser 1015*a*. Specifically, when the output state of the second reverser 1015*a* is "1", the fourth switch control unit 1010*d* is controlled to be on. At this moment, the second charging management circuit 201 may be power-supplied by the VBUS terminal of the second USB interface 200. When the output state of the second reverser 1015*a* is "0", the first switch control unit 1010*a* is controlled to be off.

The output terminal of the first control switch 1011*b* of the first determination control circuit 1011 further connects an input terminal of the third switch control unit 1010*c* to control on or off of the third switch control unit 1010*c* based on the output state of the first control switch 1011*b* of the first determination control circuit 1011. Specifically, when the first control switch 1011*b* is on, namely when the output state of the first control switch 1011*b* is "1", the third switch control unit 1010*c* is controlled to be on. At this moment, the second charging management circuit 201 is power-supplied by the VBUS terminal of the first USB interface 100. When the first control switch 1011*b* is off, namely when the output state of the first control switch 1011*b* is "0", the third switch control unit 1010*c* is controlled to be off.

Further referring to FIG. 3, further, the gating control module 101 may include a first current control circuit 1013 and a second current control circuit 1016. Further, the first current control circuit 1013 may include an input terminal and an output terminal. The input terminal of the first current control circuit 1013 may connect the output terminal of the first control switch 1011*b* of the first determination control circuit 1011 and the output terminal of the second control switch 1014*b* of the second determination control circuit 1014, and the output terminal of the first current control circuit 1013 may connect the first charging management circuit 102 to control charging current transmitted from the first charging management circuit 102 to a first battery based on the output state of the first control switch 1011*b* of the first determination control circuit 1011 and the output state of the second control switch 1014*b* of the second determination control circuit 1014. Specifically, when the first control switch 1011*b* is on (namely when the output state of the first control switch 1011*b* is "1") and when the second control switch 1014*b* is off (namely when the output state of the second control switch 1014*b* is "0"), or when the first control switch 1011*b* is off (namely when the output state of the first control switch 1011*b* is "0") and when the second control switch 1014*b* is on (namely when the output state of the second control switch 1014*b* is "1"), the first current control circuit 1013 controls the first charging management circuit 102 to transmit the charging current to the first battery of the master device based on a charging type, and the second current control circuit 1016 controls the second charging management circuit 201 to transmit the charging current to the second battery of the slave device based on a charging type.

The second current control circuit 1016 may include an input terminal and an output terminal The input terminal of the second current control circuit 1016 may connect the output terminal of the first determination control circuit 1011 and the output terminal of the second determination control circuit 1014, and the output terminal of the second current control circuit 1016 may connect the second charging management circuit 201 to control the second charging management circuit 201 to transmit the charging current to the second battery based on the output state of the first determination control circuit 1011 and the output state of the second determination control circuit 1014. Specifically, when the first control switch 1011*b* and the second control switch 1014*b* are simultaneously off (namely when the output state of the first control switch 1011*b* and the output state of the second control switch 1014*b* are "0"), or when the first control switch 1011*b* and the second control switch 1014*b* are simultaneously on (namely when the output state of the first control switch 1011*b* and the output state of the second control switch 1014*b* are "1"), the first current control circuit 1013 controls the first charging management circuit 102 to charge the first battery of the master device at a fixed charging current, and the second current control circuit 1016 controls the second charging management circuit 201 to charge the second battery of the salve device at a fixed charging current, wherein magnitude of the fixed charging current may depend on actual needs.

In the charging control system of the present disclosure, the master device and the slave device are provided with a plurality of charging input circuit. The input terminal of the gating control circuit is coupled to the first USB interface of the master device and the second USB interface of the slave device, and the output terminal of the gating control circuit is coupled to the first charging management circuit of the master device and the second charging management circuit of the slave device. The gating control circuit selects and controls charging USB interfaces of the charging management circuits of the master device and the slave device by means of switch regulating and logical circuits to implement charging control in different modes without additional software support.

The above are merely embodiments of the present disclosure and are not intended to limit the patent scope of the present disclosure. Any modifications of equivalent structure or equivalent process made on the basis of the contents of the description and accompanying drawings of the present disclosure or directly or indirectly applied to other related technical fields shall similarly fall within the scope of patent protection of the present disclosure.

What is claimed is:

1. A charging control system, comprising:
    a master device, comprising a first USB interface and a first charging management circuit, wherein the first USB interface comprises a D+ terminal, a D− terminal, a VBUS terminal and a ID terminal;
    at least one slave device, comprising a second USB interface and a second charging management circuit, wherein the second USB interface comprises a D+ terminal, a D− terminal and a VBUS terminal;
    a gating control circuit comprising an input terminal and an output terminal, wherein the whole gating control circuit is arranged in the master device or the whole gating control circuit is arranged in the slave device, wherein the input terminal of the gating control circuit is coupled to the first USB interface and the second USB interface, and the output terminal of the gating control circuit is directly coupled to the first charging management circuit and the second charging management circuit to select and control a charging USB interface of the first charging management circuit and a charging USB interface of the second charging management circuit;
    wherein the gating control circuit comprises a switch control circuit, and the switch control circuit further comprises a first switch control unit, a second switch control unit, a third switch control circuit, and a fourth switch control circuit, the first switch control unit, the second switch control unit, the third switch control circuit, and the fourth switch control circuit are single-pole single-throw switches or switch tubes;
    wherein the first switch control unit comprises an input terminal and an output terminal, the input terminal of the first switch control unit connects the VBUS terminal of the first USB interface, and the output terminal of the first switch control unit connects the first charging management circuit to control the VBUS terminal of the first USB interface to supply power for the first charging management circuit;
    the second switch control unit comprises an input terminal and an output terminal, the input terminal of the second switch control unit connects the VBUS terminal of the second USB interface, and the output terminal of the second switch control unit connects the first charging management circuit to control the VBUS terminal of the second USB interface to supply power for the first charging management circuit;

the third switch control unit comprises an input terminal and an output terminal, the input terminal of the third switch control unit connects the VBUS terminal of the first USB interface, and the output terminal of the third switch control unit connects the second charging management circuit to control the VBUS terminal of the first USB interface to supply power for the second charging management circuit;

the fourth switch control unit comprises an input terminal and an output terminal, the input terminal of the fourth switch control unit connects the VBUS terminal of the second USB interface, and the output terminal of the fourth switch control unit connects the second charging management circuit to control the VBUS terminal of the second USB interface to supply power for the second charging management circuit.

2. The charging control system according to claim 1, wherein the gating control circuit further comprises a first determination control circuit, a second determination control circuit, a first logic control circuit, and a second logic control circuit;

wherein the first determination control circuit comprises an input terminal and an output terminal, the input terminal of the first determination control circuit connects the D+ terminal and the D− terminal of the first USB interface to control an output state of the first determination control circuit based on a connection state between the D+ terminal and the D− terminal of the first USB interface;

the second determination control circuit comprises an input terminal and an output terminal, the input terminal of the second determination control circuit connects the D+ terminal and the D− terminal of the second USB interface to control an output state of the second determination control circuit based on a connection state between the D+ terminal and the D− terminal of the second USB interface;

the first logic control circuit comprises an input terminal and an output terminal, the input terminal of the first logic control circuit connects the ID terminal of the first USB interface and the output terminal of the first determination control circuit, and the output terminal of the first logic control circuit connects the first switch control unit to control on or off of the first switch control unit based on a level state of the ID terminal of the first USB interface and the output state of the second determination control circuit;

the output terminal of the second determination control circuit further connects the input terminal of the second switch control unit to control on or off of the second switch control unit based on output of the second determination control circuit;

the input terminal of the second logic control circuit connects the output terminal of the first determination control circuit, and the output terminal of the second logic control circuit connects the input terminal of the fourth switch control unit to control on or off of the fourth switch control unit based on the output state of the second logic control circuit; and the output terminal of the first determination control circuit further connects the input terminal of the third switch control unit to control on or off of the third switch control unit based on the output state of the first determination control circuit.

3. The charging control system according to claim 2, wherein the first determination control circuit further comprises a first determination unit and a first control switch, wherein the first determination unit comprises an input terminal and an output terminal, and the first control switch comprises an input terminal and an output terminal, the input terminal of the first determination unit connects the D+ terminal and the D− terminal of the first USB interface to determine whether the D+ terminal of the first USB interface is short-circuited with the D− terminal of the first USB interface; and the input terminal of the first control switch connects the output terminal of the first determination unit to control on or off of the first control switch based on the connection state between the D+ terminal and the D− terminal of the first USB interface; and the second determination control circuit further comprises a second determination unit and a second control switch, wherein the second determination unit comprises an input terminal and an output terminal, and the second control switch comprises an input terminal and an output terminal, the input terminal of the second determination unit connects the D+ terminal and the D− terminal of the second USB interface to determine whether the D+ terminal of the second USB interface is short-circuited with the D− terminal of the second USB interface; and the input terminal of the second control switch connects the output terminal of the second determination unit to control on or off of the second control switch based on the connection state between the D+ terminal and the D− terminal of the second USB interface.

4. The charging control system according to claim 3, wherein when the first determination unit determines that the D+ terminal of the first USB interface is short-circuited with the D− terminal of the first USB interface, the first determination unit controls the first control switch to be on; or when the first determination unit determines that the D+ terminal of the first USB interface is not short-circuited with the D− terminal of the first USB interface, the first determination unit controls the first control switch to be off; and when the second determination unit determines that the D+ terminal of the second USB interface is short-circuited with the D− terminal of the second USB interface, the second determination unit controls the second control switch to be on; or when the second determination unit determines that the D+ terminal of the second USB interface is not short-circuited with the D− terminal of the second USB interface, the second determination unit controls the second control switch to be off.

5. The charging control system according to claim 2, wherein the first logic control circuit further comprises a first reverser and a multiplier, wherein the first reverser comprises an input terminal and an output terminal, and the multiplier comprises an input terminal and an output terminal, the input terminal of the first reverser connects the output terminal of the second determination control circuit, the input terminal of the multiplier connects the ID terminal of the first USB interface and the output terminal of the first reverser, and the output terminal of the multiplier connects the first switch control unit to control on or off of the first switch control unit based on an output state of the multiplier; and the second logic control circuit further comprises a second reverser, wherein the second reverser comprises an input terminal and an output terminal, the input terminal of the second reverser connects the first determination control circuit, and the output terminal of the second reverser connects the fourth switch control unit to control on or off of the fourth switch control unit based on an output state of the second reverser.

6. The charging control system according to claim 2, wherein the gating control module further comprises a first current control circuit and a second current control circuit;

wherein the first current control circuit comprises an input terminal and an output terminal, the input terminal of the first current control circuit connects the output terminal of the first determination control circuit and the output terminal of the second determination control circuit, and the output terminal of the first current control circuit connects the first charging management circuit to control charging current transmitted from the first charging management circuit to a first battery based on the output state of the first determination control circuit and the output state of the second determination control circuit; and the second current control circuit comprises an input terminal and an output terminal, the input terminal of the second current control circuit connects the output terminal of the first determination control circuit and the output terminal of the second determination control circuit, and the output terminal of the second current control circuit connects the second charging management circuit to control charging current transmitted from the second charging management circuit to a second battery based on the output state of the first determination control circuit and the output state of the second determination control circuit.

7. The charging control system according to claim 6, wherein when the first determination control circuit is on and the second determination control circuit is off, or when the first determination control circuit is off and the second determination control circuit is on, the first current control circuit controls the first charging management circuit to transmit the charging current to the first battery of the master device based on a charging type, and the second current control circuit controls the second charging management circuit to transmit the charging current to the second battery of the slave device based on a charging type; and when the first determination control circuit and the second determination control circuit are simultaneously off, or when the first determination control circuit and the second determination control circuit are simultaneously on, the first current control circuit controls the first charging management circuit to charge the first battery of the master device at a fixed charging current, and the second current control circuit controls the second charging management circuit to charge the second battery of the slave device at a fixed charging current.

8. A charging control system, comprising:
a master device, comprising a first USB interface and a first charging management circuit, wherein the first USB interface comprises a D+ terminal, a D− terminal, a VBUS terminal and a ID terminal;
at least one slave device, comprising a second USB interface and a second charging management circuit wherein the second USB interface comprises a D+ terminal, a D− terminal and a VBUS terminal;
a gating control circuit comprising an input terminal and an output terminal, wherein the whole gating control circuit is arranged in the master device or the whole gating control circuit is arranged in the slave device, wherein the input terminal of the gating control circuit is coupled to the first USB interface and the second USB interface, and the output terminal of the gating control circuit is directly coupled to the first charging management circuit and the second charging management circuit to select and control a charging USB interface of the first charging management circuit and a charging USB interface of the second charging management circuit;

the gating control circuit comprises a switch control circuit, and the switch control circuit further comprises a first switch control unit, a second switch control unit, a third switch control circuit, and a fourth switch control circuit;

wherein the first switch control unit comprises an input terminal and an output terminal, the input terminal of the first switch control unit connects the VBUS terminal of the first USB interface, and the output terminal of the first switch control unit connects the first charging management circuit to control the VBUS terminal of the first USB interface to supply power for the first charging management circuit;

the second switch control unit comprises an input terminal and an output terminal, the input terminal of the second switch control unit connects the VBUS terminal of the second USB interface, and the output terminal of the second switch control unit connects the first charging management circuit to control the VBUS terminal of the second USB interface to supply power for the first charging management circuit;

the third switch control unit comprises an input terminal and an output terminal, the input terminal of the third switch control unit connects the VBUS terminal of the first USB interface, and the output terminal of the third switch control unit connects the second charging management circuit to control the VBUS terminal of the first USB interface to supply power for the second charging management circuit; and the fourth switch control unit comprises an input terminal and an output terminal, the input terminal of the fourth switch control unit connects the VBUS terminal of the second USB interface, and the output terminal of the fourth switch control unit connects the second charging management circuit to control the VBUS terminal of the second USB interface to supply power for the second charging management circuit.

9. The charging control system according to claim 8, wherein the gating control circuit further comprises a first determination control circuit, a second determination control circuit, a first logic control circuit, and a second logic control circuit;

wherein the first determination control circuit comprises an input terminal and an output terminal, the input terminal of the first determination control circuit connects the D+ terminal and the D− terminal of the first USB interface to control an output state of the first determination control circuit based on a connection state between the D+ terminal and the D− terminal of the first USB interface;

the second determination control circuit comprises an input terminal and an output terminal, the input terminal of the second determination control circuit connects the D+ terminal and the D− terminal of the second USB interface to control an output state of the second determination control circuit based on a connection state between the D+ terminal and the D− terminal of the second USB interface;

the first logic control circuit comprises an input terminal and an output terminal, the input terminal of the first logic control circuit connects the ID terminal of the first USB interface and the output terminal of the second determination control circuit, and the output terminal of the first logic control circuit connects the first switch control unit to control on or off of the first switch control unit based on a level state of the ID terminal of the first USB interface and the output state of the second determination control circuit;

the output terminal of the second determination control circuit further connects the input terminal of the second switch control unit to control on or off of the second switch control unit based on output of the second determination control circuit;

the input terminal of the second logic control circuit connects the output terminal of the first determination control circuit, and the output terminal of the second logic control circuit connects the input terminal of the fourth switch control unit to control on or off of the fourth switch control unit based on the output state of the second logic control circuit; and the output terminal of the first determination control circuit further connects the input terminal of the third switch control unit to control on or off of the third switch control unit based on the output state of the first determination control circuit.

10. The charging control system according to claim 9, wherein the first determination control circuit further comprises a first determination unit and a first control switch, wherein the first determination unit comprises an input terminal and an output terminal, and the first control switch comprises an input terminal and an output terminal, the input terminal of the first determination unit connects the D+ terminal and the D− terminal of the first USB interface to determine whether the D+ terminal of the first USB interface is short-circuited with the D− terminal of the first USB interface; and the input terminal of the first control switch connects the output terminal of the first determination unit to control on or off of the first control switch based on the connection state between the D+ terminal and the D− terminal of the first USB interface; and the second determination control circuit further comprises a second determination unit and a second control switch, wherein the second determination unit comprises an input terminal and an output terminal, and the second control switch comprises an input terminal and an output terminal, the input terminal of the second determination unit connects the D+ terminal and the D− terminal of the second USB interface to determine whether the D+ terminal of the second USB interface is short-circuited with the D− terminal of the second USB interface; and the input terminal of the second control switch connects the output terminal of the second determination unit to control on or off of the second control switch based on the connection state between the D+ terminal and the D− terminal of the second USB interface.

11. The charging control system according to claim 10, wherein when the first determination unit determines that the D+ terminal of the first USB interface is short-circuited with the D− terminal of the first USB interface, the first determination unit controls the first control switch to be on; or when the first determination unit determines that the D+ terminal of the first USB interface is not short-circuited with the D− terminal of the first USB interface, the first determination unit controls the first control switch to be off; and when the second determination unit determines that the D+ terminal of the second USB interface is short-circuited with the D− terminal of the second USB interface, the second determination unit controls the second control switch to be on; or when the second determination unit determines that the D+ terminal of the second USB interface is not short-circuited with the D− terminal of the second USB interface, the second determination unit controls the second control switch to be off.

12. The charging control system according to claim 9, wherein the first logic control circuit further comprises a first reverser and a multiplier, wherein the first reverser comprises an input terminal and an output terminal, and the multiplier comprises an input terminal and an output terminal, the input terminal of the first reverser connects the output terminal of the second determination control circuit, the input terminal of the multiplier connects the ID terminal of the first USB interface and the output terminal of the first reverser, and the output terminal of the multiplier connects the first switch control unit to control on or off of the first switch control unit based on an output state of the multiplier; and the second logic control circuit further comprises a second reverser, wherein the second reverser comprises an input terminal and an output terminal, the input terminal of the second reverser connects the first determination control circuit, and the output terminal of the second reverser connects the fourth switch control unit to control on or off of the fourth switch control unit based on an output state of the second reverser.

13. The charging control system according to claim 9, wherein the gating control module further comprises a first current control circuit and a second current control circuit;

wherein the first current control circuit comprises an input terminal and an output terminal, the input terminal of the first current control circuit connects the output terminal of the first determination control circuit and the output terminal of the second determination control circuit, and the output terminal of the first current control circuit connects the first charging management circuit to control charging current transmitted from the first charging management circuit to a first battery based on the output state of the first determination control circuit and the output state of the second determination control circuit; and the second current control circuit comprises an input terminal and an output terminal, the input terminal of the second current control circuit connects the output terminal of the first determination control circuit and the output terminal of the second determination control circuit, and the output terminal of the second current control circuit connects the second charging management circuit to control charging current transmitted from the second charging management circuit to a second battery based on the output state of the first determination control circuit and the output state of the second determination control circuit.

14. The charging control system according to claim 13, wherein when the first determination control circuit is on and the second determination control circuit is off, or when the first determination control circuit is off and the second determination control circuit is on, the first current control circuit controls the first charging management circuit to transmit the charging current to the first battery of the master device based on a charging type, and the second current control circuit controls the second charging management circuit to transmit the charging current to the second battery of the slave device based on a charging type; and when the first determination control circuit and the second determination control circuit are simultaneously off, or when the first determination control circuit and the second determination control circuit are simultaneously on, the first current control circuit controls the first charging management circuit to charge the first battery of the master device at a fixed charging current, and the second current control circuit controls the second charging management circuit to charge the second battery of the slave device at a fixed charging current.

15. The charging control system according to claim 9, wherein the master device supports an On-The-Go (OTG) function, whereas the slave device does not support the OTG function.

16. The charging control system according to claim 8, wherein the master device supports an On-The-Go (OTG) function, whereas the slave device does not support the OTG function.

17. The charging control system according to claim 16, wherein when the master device enables the OTG function, the ID terminal of the first USB interface is a low level, and the VBUS terminal of the first USB interface is turned off.

18. The charging control system according to claim 8, wherein the master device supports an On-The-Go (OTG) function, whereas the slave device does not support the OTG function.

19. The charging control system according to claim 18, wherein when the master device enables the OTG function, the ID terminal of the first USB interface is a low level, and the VBUS terminal of the first USB interface is turned off.

\* \* \* \* \*